(12) United States Patent
Litke et al.

(10) Patent No.: US 9,886,298 B2
(45) Date of Patent: Feb. 6, 2018

(54) DETECTING AN INTERRUPTED OPERATION ASSOCIATED WITH A VIRTUAL MACHINE

(71) Applicant: Red Hat, Inc., Raleigh, NC (US)

(72) Inventors: Adam Litke, Bethel Park, PA (US); Federico Simoncelli, Fano (IT)

(73) Assignee: Red Hat, Inc., Raleigh, NC (US)

( * ) Notice: Subject to any disclaimer, the term of this patent is extended or adjusted under 35 U.S.C. 154(b) by 352 days.

(21) Appl. No.: 14/628,881

(22) Filed: Feb. 23, 2015

(65) Prior Publication Data

US 2016/0246627 A1 Aug. 25, 2016

(51) Int. Cl.
| | |
|---|---|
| *G06F 9/455* | (2006.01) |
| *H05K 7/10* | (2006.01) |
| *G06F 3/06* | (2006.01) |
| *G06F 13/24* | (2006.01) |
| *G06F 9/48* | (2006.01) |

(52) U.S. Cl.
CPC ........ *G06F 9/45558* (2013.01); *G06F 3/0619* (2013.01); *G06F 3/0665* (2013.01); *G06F 3/0689* (2013.01); *G06F 9/4812* (2013.01); *G06F 13/24* (2013.01); *G06F 2009/45575* (2013.01); *G06F 2009/45579* (2013.01)

(58) Field of Classification Search
None
See application file for complete search history.

(56) References Cited

U.S. PATENT DOCUMENTS

| | | |
|---|---|---|
| 8,392,372 B2 | 3/2013 | Ferguson et al. |
| 8,881,171 B1 | 11/2014 | Backensto et al. |
| 2014/0149347 A1 | 5/2014 | Ben-Shaul et al. |
| 2014/0181085 A1 | 6/2014 | Gokhale et al. |
| 2014/0188812 A1 | 7/2014 | Vijayan |
| 2014/0297979 A1 | 10/2014 | Baron et al. |

OTHER PUBLICATIONS

Posey; Managing Hyper-V Snapshots (Part 3), VirtualizationAdmin.com, Oct. 29, 2013.*
Armstrong; What happens if I start a virtual machine that is merging snapshot files? [Hyper-V]; blogs.msdn.microsoft.com/virtual_pc_guy/2009/04/21/what-happens-if-i-start-a-virtual-machine-that-is-merging-snapshot-files-hyper-v/; Apr. 21, 2009.*
Finn, Aidan; Windows Server 8 Hyper-V-Snapshots & Live Merge, Youtube, Mar. 24, 2012.*
Anonymous, "3 Ways to Deal With Lingering Hyper-V Checkpoints Formerly Known as Snapshots," Working Hart in IT—My view of IT from the trenches, Posted Aug. 25, 2015, workinghardinit.wordpress.com/2014/08/25/3-ways-to-deal-with-lingering-hyper-v-checkpoints-formerly-known-as-snapshots.

(Continued)

Primary Examiner — Bing Zhao
(74) Attorney, Agent, or Firm — Lowenstein Sandler LLP (57) ABSTRACT

A first identification of a series of volumes associated with a virtual disk that is associated with a virtual machine is received. A second identification of the series of volumes associated with the virtual disk is received. An operation associated with the virtual disk may be identified as being interrupted in view of a comparison of the first identification with the second identification. In response to identifying that the operation has been interrupted, a volume from at least one of the first or second identifications may be removed.

16 Claims, 6 Drawing Sheets

(56) References Cited

OTHER PUBLICATIONS

Goldblatt, Kevin Alon, "Bug 1161127—[JSONRPC]Live merge—failed to delete snapshot on 2nd attempt—first attempt was interrupted with shutdown of vm," Posted Nov. 6, 2014, bugzilla.redhat.com/show_bug.cgi?id=1161127.
Litke, Adam, "Thanks for Live Snapshots, Where's Live Merge?," KVM Forum, Oct. 16, 2014, www.ovirt.org/Features/Live_Mergedevel@ovirt.org.
Litke, Adam, "Change in vdsm[master]: Live Merge: add reconcileVolumeChain verb," Posted Aug. 21, 2014, lists.fedorahosted.org/pipermail/vdsm-patches/2014-August/067368.html.

* cited by examiner

DETECTING AN INTERRUPTED OPERATION ASSOCIATED WITH A VIRTUAL MACHINE

TECHNICAL FIELD

Aspects of the disclosure generally relate to virtual machines and, more specifically, relate to detecting an interrupted operation associated with a virtual machine.

BACKGROUND

A virtual machine (VM) may be a software-based emulation of computer hardware. For example, the VM may operate based on computer architecture and functions of computer hardware resources associated with hard disks or other such memory. A virtual disk that emulates the hard disk or memory may be utilized by the VM. Thus, the VM may emulate a physical computing environment, but requests for a hard disk or memory may be managed by a virtualization layer which translates these requests to the underlying physical computing hardware resources. The virtualization layer may be part of a virtual machine management application that manages the virtual machine and the virtual disk.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure relate to detecting an interrupted operation associated with a virtual machine. The operation may be a live merge operation associated with a virtual disk of a virtual machine. The virtual machine (VM) may be based on a virtual disk (also referred to as a virtual disk image) that is a series of volumes. One or more of the volumes may be a snapshot, which may refer to a copy of changes made to the virtual disk at a particular point in time. For example, when a change is made to the virtual disk after the snapshot has been created, the snapshot may be created to copy the changed data or area of the virtual disk as it was prior to the change so that a prior state of the virtual disk may be reconstructed (e.g., by rolling back or undoing the changes through utilizing the saved changed data). Thus, the snapshot may contain differences or changes that were made to a virtual disk between the time that the snapshot was created and the parent of the snapshot (e.g., the virtual disk or another snapshot).

As previously described, the virtual disk may be based on a series of volumes. For example, a first snapshot may be created based on the virtual disk and subsequent changes to the virtual disk may be recorded in the first snapshot. A second snapshot may be based on the first snapshot and subsequent changes (e.g., to either the virtual disk or first snapshot) may then be recorded in the second snapshot. Furthermore, a third snapshot may then be based on the second snapshot and subsequent changes may be saved in the third snapshot. A final volume, created after the third snapshot, may be used to record new data. Thus, as an example, the virtual disk may based on a series of volumes that includes the original virtual disk, the first snapshot, the second snapshot, the third snapshot, and a final volume. Such a series of volumes may also be referred to as a volume chain or a series of volumes. Each snapshot may be a read-only volume or component of the series of volumes or the volume chain so that each snapshot represents the virtual disk at a particular point in time (e.g., between the time the snapshot is created and a following snapshot is created). The final volume of the series may store current changes that are made to the virtual disk or any prior volumes by the virtual machine. Thus, the final volume is the only volume that is actively updated by a virtual machine using the virtual disk.

A live merge operation may be performed on the virtual disk. In some embodiments, a live merge operation may refer to an operation performed on a virtual disk to change the series of volumes of the virtual disk as a virtual machine is writing or creating changes to the virtual disk. For example, as previously described, the virtual disk may be based on a series of volumes (e.g., an original virtual disk, a first snapshot, a second snapshot, a third snapshot, and the final volume). A live merge operation may merge or combine two or more of the volumes in the series of volumes of the virtual disk. For example, the final volume of the series of volumes may be merged into the previous volume of the series of volumes (e.g., the third snapshot). The merging or combining of the volumes may result in the adding of the changed data that has been recorded in the final volume to the previous volume as well as current changes made by the VM to the virtual disk being saved in the previous volume as opposed to being saved in the final volume of the series of volumes.

The virtual machine infrastructure environment may include a hypervisor (e.g., a virtual machine monitor) that creates and operates the VM on a host system as well as a management server that manages multiple host systems. Each host system may include one or more hypervisors that create and/or operate one or more virtual machines. Each of the hypervisor and the management server may create and modify separate data that identifies the series of volumes which a virtual disk is based upon. For example, the hypervisor may manage a file corresponding to the virtual disk (i.e., a virtual disk image file) where a header of the virtual disk file may include information that identifies the series of volumes of the virtual disk. Such header information may be referred to as a first metadata. Furthermore, the management server may store a second metadata in another file that is stored at a storage device that also stores the virtual disk file. The additional file may store the second metadata that also identifies the series of volumes that are used in the virtual disk as well as the series of volumes used by other virtual disks used by other hypervisors that manage other virtual disks and other virtual machines. Each of the hypervisor and the management server may update its respective identification of the series of volumes of the virtual disk in response to a live merge operation that is performed on the virtual disk while the virtual machine is currently writing data to the virtual disk. For example, a virtual disk used by a virtual machine may be associated with a series of volumes including four volumes 'ABCD.' A live merge operation on the virtual disk may merge the volume D with the volume C while the virtual machine is writing new data to volume D. A successful live merge operation may result in the series of volumes of the virtual disk including 'ABC' where the volume 'C' includes the data of the previous volume 'D' as well as new data written by the virtual machine being stored in volume 'C.'

A live merge operation may be interrupted. For example, a failure of the management server (e.g., a hardware malfunction) may result in the management server not detecting the results of the live merge operation while the hypervisor, which is on a host system that is separate from the management server, may perform the live merge operation and update the identification of the series of volumes in the header of the virtual disk file. The failure of the management system to detect the live merge operation due to the interruption may result in the identification of the series of volumes from the header of the virtual disk file that is managed by the hypervisor not matching the identification of the series of volumes in the metadata that is updated by the management server. As such, an inconsistency between the identifications of the series of volumes may result in the failure of the management server during the performance of the live merge operation of a virtual disk.

An additional volume may be imported into the virtual disk that is used by the virtual machine. The importing of the volume may be based on the series of volumes of a virtual disk. If a live merge operation has been interrupted, then the series of volumes that are maintained by the hypervisor and the management server may differ. For example, if the series of volumes that are identified by the management server differ from the series of volumes for the same virtual disk that are identified from the header of the virtual disk file as maintained by the hypervisor, then the importing of the volume into the virtual disk may result in the virtual disk being corrupted. In order to ensure that the virtual disk is not corrupted in response to the importing of the additional volume, the series of volumes identified from the header of the virtual disk file may be compared with the series of volumes that are identified from the metadata of the additional file. If the series of volumes are identical, then the volume may be imported into the virtual disk. However, if the series of volumes are not identical, then the series of volumes identified in the metadata of the additional file may be modified to match the series of volumes in the header of the virtual disk file. The additional volume may then be imported into the virtual disk after the modification of the series of volumes that are identified in the metadata of the additional file.

Thus, aspects of the present disclosure may prevent the corruption of a virtual disk by preventing the importing of a volume into the virtual disk if the series of volumes identified from the metadata managed by the management server and the series of volumes identified from the header of the virtual disk file managed by the hypervisor do not match.

Figure 1:
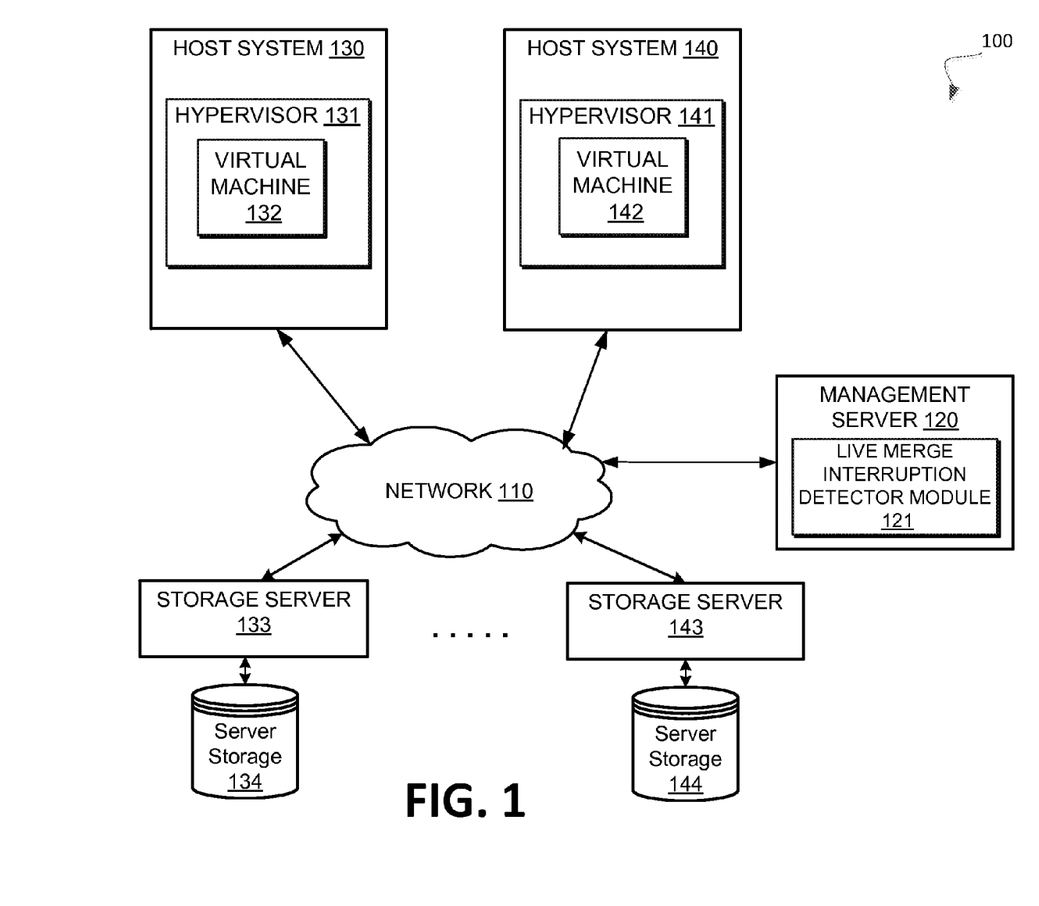
FIG. 1 illustrates an example system architecture in which embodiments of the disclosure may operate.

FIG. 1 is an example system architecture 100 for various implementations of the disclosure. The system architecture 100 may include host systems 130 and 140 coupled to one or more storage servers 133 and 143 via a network 110. The network 110 may be a public network (e.g., the Internet), a private network (e.g., a local area network (LAN) or wide area network (WAN)), or a combination thereof. Network 110 may include a wireless infrastructure, which may be provided by one or multiple wireless communications systems, such as a wireless fidelity (WiFi) hotspot connected with the network 110 and/or a wireless carrier system that can be implemented using various data processing equipment, communication towers, etc.

The host systems 130 and 140 may each include a hypervisor (e.g., hypervisors 131 or 141) that are each associated with a virtual machine (e.g., virtual machine 132 and virtual machine 142). The host systems 130 or 140 may include, but are not limited to, desktop computers, laptop computers, rackmount servers, routers, switches, tablet computers, mobile phones, or any other type of computing device. The host systems 130 and 140 may include hardware resources may include one or more processing devices, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources may be used to execute software, including one or more operating systems, virtual machines (e.g., a virtual machine based on a mobile communications device), or other applications.

The hardware resources of a host system may provide one or more services such as, but not limited to, networking services, storage services, and software libraries. In some embodiments, the hypervisor (e.g., hypervisor 131 or 141), also referred to as a virtual machine monitor (VMM) and/or a virtual machine (e.g., virtual machine 132 or 142) may use the one or more services that are provided by the host system. The hypervisors 131 or 141 is an application that executes on a host system 130 or 140 to manage virtual machines 132 or 142. In particular, the hypervisor may instantiate or start, migrate, pause, or perform another type of event associated with virtual machines 132 and 142. For example, the hypervisor 131 or 141 may perform a live merge operation for a virtual disk used by the virtual machine 132 or 142. In some embodiments, the hypervisor 131 or 141 may further coordinate metadata changes in the system architecture 100, such as creating and deleting virtual disk images, creating and merging snapshots, copying images between storage domains, creating templates and storage allocation for block devices of the hardware resources such as hard drives or other storage devices. In some embodiments, the hypervisor 131 or 141 may update a series of volumes identified in a virtual disk image file that is stored at a server storage device 134 or 144.

The hypervisor 131 or 141 may include a virtualization API and a multi-platform emulator. Each virtual machine 132 and 142 may execute a guest operating system that can be accessed by a client system over the network 110. Each virtual machine 132 and 142 may further run guest applications using the guest operating system.

As shown in FIG. 1, the system architecture 100 may further include a management server 120. In some embodiments, the management server 120 may manage the utilization of the hardware resources of the host systems 130 and 140 as well as aspects of the storage servers 133 and 143 and the corresponding server storage devices 134 and 144. The management server 120 may include a live merge interruption detector module 121 that may detect whether or not a live merge operation performed by the hypervisor 131 or hypervisor 141 for a virtual disk stored at the server storage device 134 or 144 was interrupted by a failure of the management server 120. For example, the hypervisor 131 or 141 may update an identification of a series of volumes of a virtual disk stored within a header of the virtual disk file at the server storage 134 or 144 and the management server may update metadata of another file associated with the virtual disk file that is also stored at the server storage 134 or 144. Further details with regard to the live merge interruption detector module 121 disclosed below.

Figure 2:
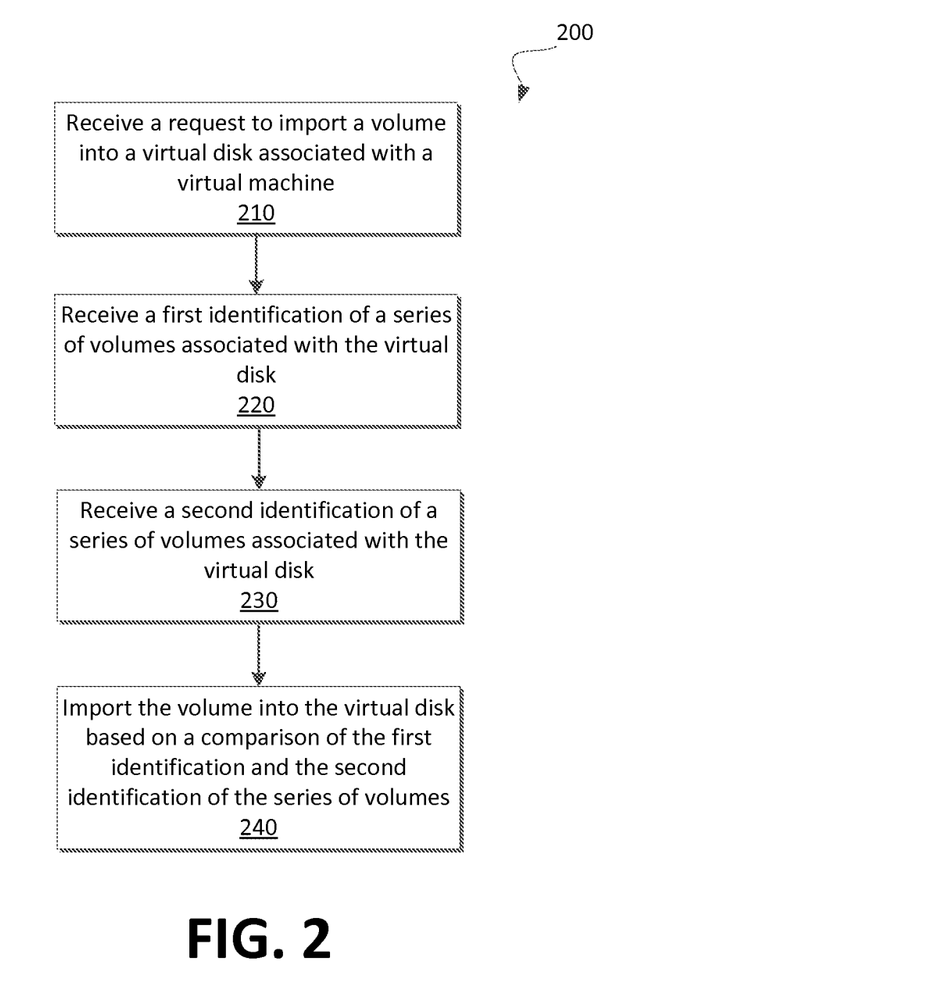
FIG. 2 is a flow diagram of an example method to import a volume based on detecting an interrupted live merge operation in accordance with some embodiments.

FIG. 2 is a flow diagram of an example method 200 to import a volume based on detecting an interrupted live merge operation. The method 200 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 200 may be performed by a live merge interruption detector module 121 of a management server 120 as described with relation to FIG. 1.

Figures 4A, 4B:
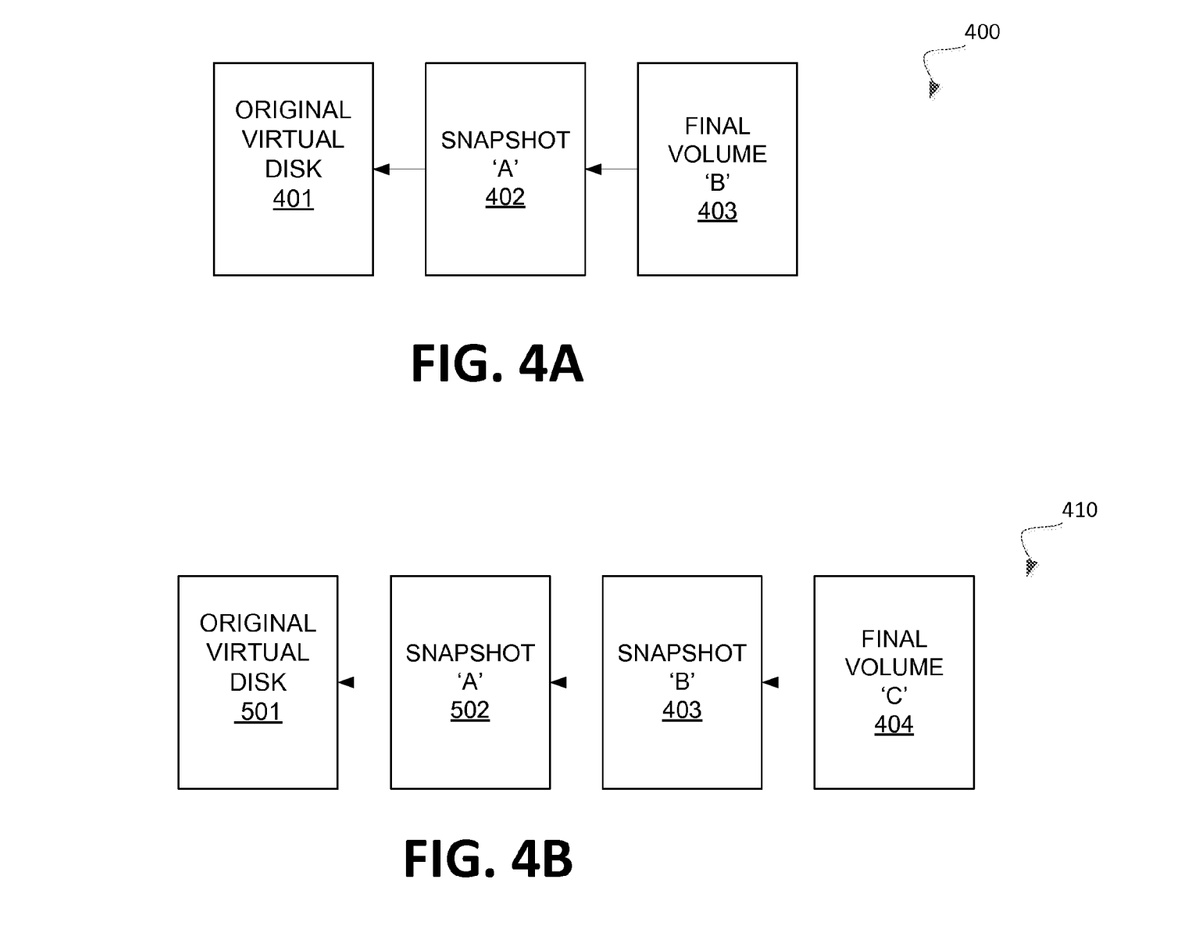
FIG. 4A is an illustrated example of a first series of volumes associated with a virtual disk in accordance with some embodiments of the present disclosure.
FIG. 4B is an illustrated example of a second series of volumes that is inconsistent with the first series of volumes in accordance with some embodiments of the disclosure.

As shown, the method 200 may begin by the processing logic receiving a request to import a volume into a virtual disk that is associated with a virtual machine (block 210). For example, a request to import a volume of data to the virtual disk that is currently used by a virtual machine may be received. The processing logic may further receive a first identification of a series of volumes that are associated with the virtual disk (block 220). For example, the first identification of the series of volumes may be metadata that is included in a header of a virtual disk file. The first identification of the series of volumes may be maintained (e.g., updated) by a hypervisor in response to a live merge operation that has been performed by the hypervisor. As an example, after the hypervisor has performed a live merge operation, the hypervisor may modify the metadata included in the header of the virtual disk file to remove the last volume from the series of volumes that are identified in the header. The processing logic may further receive a second identification of a series of volumes that are associated with the virtual disk (block 230). For example, the second identification of the series of volumes may be metadata that is included in an additional file that is stored with the virtual disk file. The additional file may be stored on the same storage device as the virtual disk file. Furthermore, the metadata in the additional file may be maintained or updated by a management server that is associated with multiple hypervisors. In some embodiments, the metadata in the additional file may identify multiple series of volumes corresponding to multiple virtual disk files. The processing logic may further import the volume into the virtual disk based on a comparison of the first identification of the series of volumes and the second identification of the series of volumes (block 240). For example, the volume may be imported into the virtual disk after a synchronization operation has been performed between the first series of volumes and the second series of volumes if the second series of volumes includes an additional volume. Further details regarding the comparing of the first identification with the second identification are disclosed in conjunction with FIG. 4. The comparison of the first identification of the series of volumes with the second identification of the series of volumes may detect an interrupted live merge operation.

Thus, a volume may be imported into a virtual disk based on a comparison between two series of volumes that are maintained by different servers (e.g., the hypervisor on a host server and the management server). If an interrupted live merge operation is detected from the comparison of the series of volumes, then the volume may be imported into the virtual disk after a synchronization operation has been performed to remove a volume from one of the series of volumes.

Figure 3:
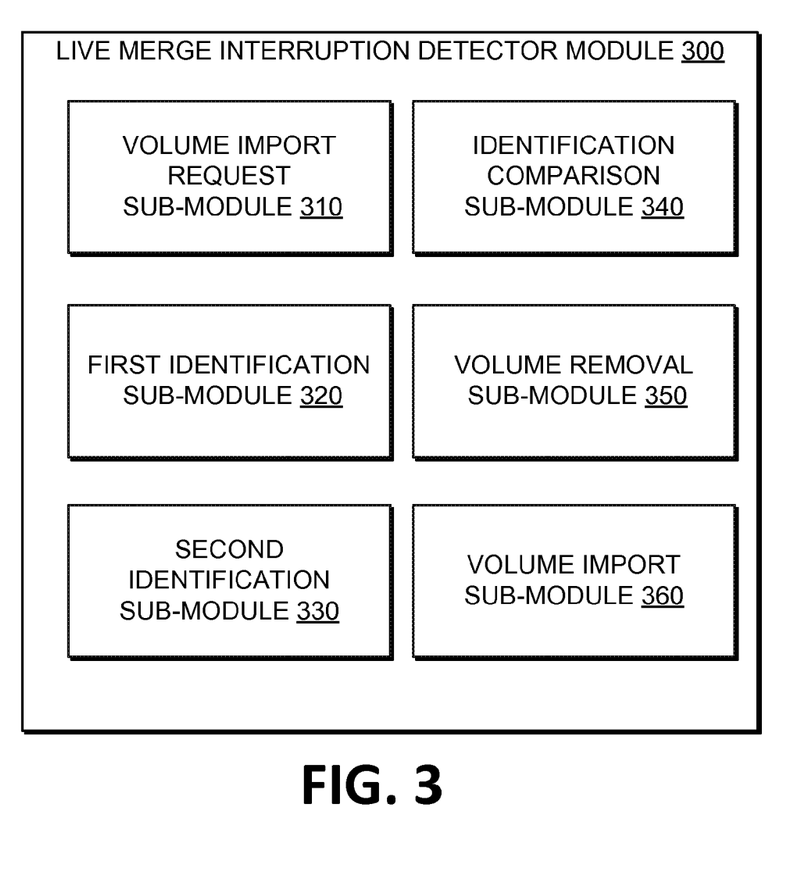
FIG. 3 illustrates an example live merge interruption detector module in accordance with some embodiments of the disclosure.

FIG. 3 is a block diagram of an example live merge interruption detector module 300. In general, the live merge interruption detector module 300 may correspond to the live merge interruption detector module 121 of FIG. 1. The live merge interruption detector module 300 may include a volume import request sub-module 210, a first identification sub-module 220, a second identification sub-module 230, an identification comparison sub-module 240, a volume removal sub-module 250, and a volume import sub-module 260. In alternative embodiments, the functionality of one or more of the sub-modules may be combined or divided.

As shown in FIG. 3, the live merge interruption detector module 300 may include a volume import request sub-module 310 that may receive a request to import a volume of data into a virtual disk that is used by a virtual machine. The importing of the volume of data into the virtual disk may result in a change of configuration settings, operating environment, or a change in data that the virtual machine operates upon. The first identification sub-module 320 may identify a first series of volumes of a virtual disk that is subjected to the volume import request. The first series of volumes may be identified in response to the volume import request. The second identification sub-module 330 may identifies a second series of volumes of the virtual disk that is subjected to the volume import request. In some embodiments, the second series of volumes may be identified in response to the volume import request. The identification comparison sub-module 340 may compare the first series of volumes with the second series of volumes. The comparison of the series of volumes may determine if one of the series of volumes includes an additional volume that is not included in the other series of volumes. An interrupted live merge operation may have occurred if one of the series of volumes includes the additional volume that is not included in the other series of volumes.

Referring to FIG. 3, the volume removal sub-module 350 may remove a volume from a series of volumes. For example, a volume may be removed from an identification of a series of volumes if a comparison between the first series of volumes and the second series of volumes identifies that one of the series of volumes includes an additional volume. For example, if the first series of volumes includes the volumes in the order 'ABCD' and the second series of volumes includes the volumes in the order 'ABCDE,' then the second series of volumes includes an additional volume 'E' that is not included in the first series of volumes. Accordingly, the additional volume 'E' may be removed from the second series of volumes. For example, the management server may update the metadata in the additional file stored with the virtual disk file so that the metadata no longer includes the additional volume 'E' as being a volume for the virtual disk corresponding to the virtual disk file. The volume import sub-module 360 may import the volume associated of the volume import request into a virtual disk. For example, the volume may be imported into the virtual disk after the series of volumes for the virtual disk have been compared and/or modified to be identical.

FIG. 4A is an illustrated example of a first series of volumes 400 associated with a virtual disk. In general, the first series of volumes 400 may be a series of volumes that are identified from a virtual disk file that is updated by a hypervisor 131 or 141 of FIG. 1 in response to performing a live merge operation.

As shown in FIG. 4A, the first series of volumes 400 may include a first volume 401 corresponding to an original virtual disk (i.e., the base volume), a volume 402 corresponding to a first snapshot 'A' of the original virtual disk, and a third volume 403 corresponding to a final volume. The virtual disk corresponding to the first series of volumes 400 may be used by a virtual machine. For example, new data written by the virtual machine may be stored in the third volume 403 (i.e., the final volume) as the third volume 403 is the last volume in the series of volumes 400. The volume 401 (e.g., the original virtual disk) may be a read only data corresponding to the original virtual disk and the volume 402 may be a read only data corresponding to changes that were previously made to the original virtual disk before the final volume 403 was created. In some embodiments, the final volume 403 may store changes that were made to the first volume 401 or the second volume 402.

The first series of volumes 400 may be identified from metadata corresponding to a header of a virtual disk file that is maintained by a hypervisor.

FIG. 4B is an illustrated example of a second series of volumes 410 that is inconsistent with the first series of volumes 400. In general, the second series of volumes 410 may be a series of volumes that are identified from metadata included in an additional file that is stored with a virtual disk file and that is updated by a management server 120 of FIG. 1.

As shown in FIG. 4B, the second series of volumes 410 includes the first volume 401, the second volume 402, the third volume 403, and a fourth volume 404. Accordingly, the second series of volumes includes an additional volume (e.g., the fourth volume 404 that corresponds to a final volume 'C') that is not included in the first series of volumes 400. Since the first series of volumes does not include the fourth volume 404, the second series of volumes may be considered to be inconsistent with the first series of volumes.

Thus, a first series of volumes may be considered to be inconsistent with a second series of volumes when the second series of volumes includes an additional volume (e.g., the final volume is not identical) that is not included in the first series of volumes. The removal of the additional volume (e.g., volume 404) from the second series of volumes may result in a consistency between the first series of volumes and the second series of volumes.

In some embodiments, the first series of volumes may be considered to be inconsistent with the second series of volumes when the additional volume in the second series of volumes is an internal volume. For example, as previously described, a virtual disk may be based on a series of volumes 'ABCD.' The volume 'C' may be merged with the volume 'B' so that the virtual disk is now based on a series of volumes 'ABD.' The first series of volumes may identify the volumes 'ABD' and if the second series of volumes identifies the volumes 'ABCD' (e.g., due to an interrupted live merge operation), then the additional internal volume 'C' may be considered an internal volume that is to be removed in order for the first series of volumes to be consistent with the second series of volumes.

Figure 5:
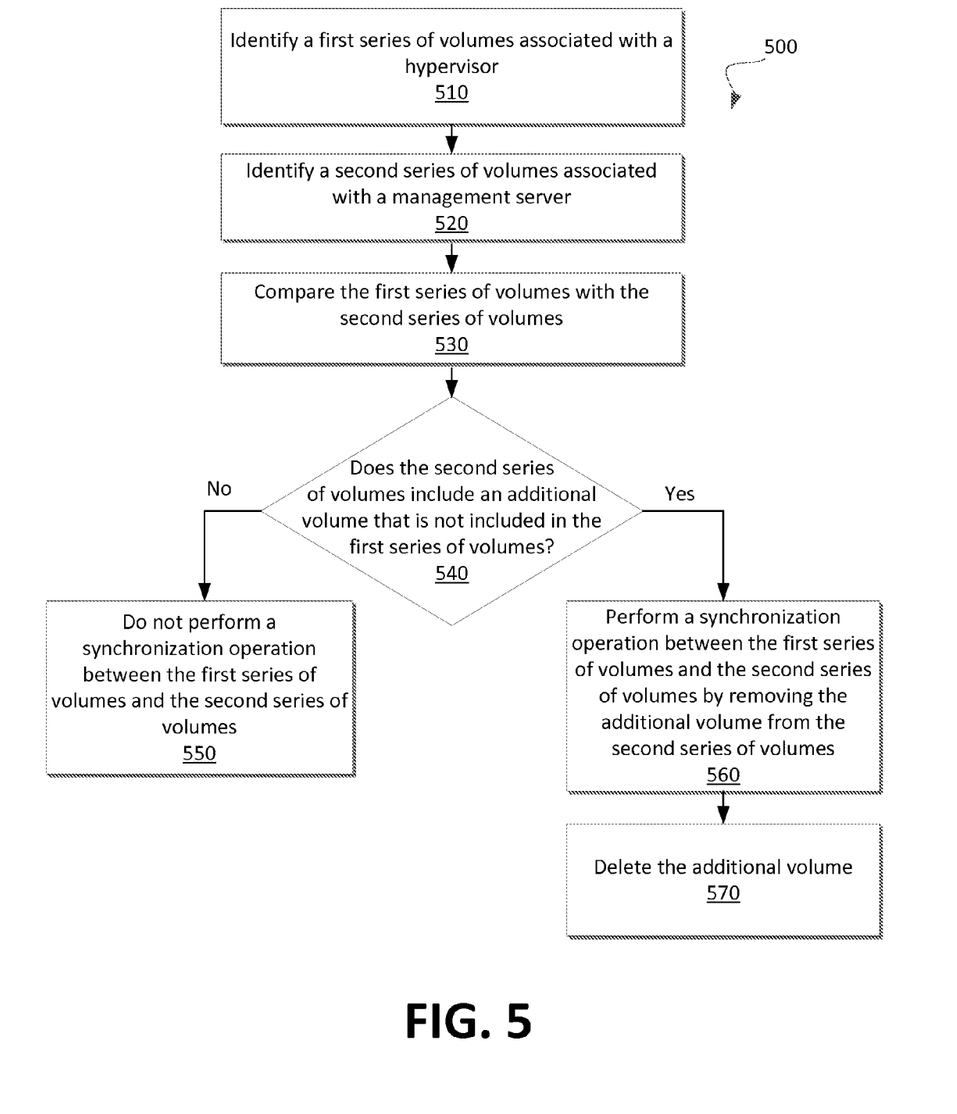
FIG. 5 is a flow diagram of an example method to synchronize a first and second series of volumes in response to detecting an interrupted live merge operation in accordance with some embodiments.

FIG. 5 is a flow diagram of an example method 500 to synchronize volume chains in response to detecting an interrupted live merge operation. In general, the method 500 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 500 may be performed by a live merge interruption detector module 121 of a management server 120 or the live merge interruption detector module 300 as described with relation to FIGS. 1 and 3.

As shown, the method 500 may begin by the processing logic identifying a first series of volumes that are associated with a hypervisor (block 510). Furthermore, the processing logic may identify a second series of volumes associated with a management server (block 520). In some embodiments, the management server may be associated with multiple hypervisors including the hypervisor that is associated with the first series of volumes. The processing logic may compare the first series of volumes with the second series of volumes (block 530). The processing logic may further determine if the second series of volumes includes an additional volume that is not included in the first series of volumes (block 540). For example, a determination may be made as to whether the last volume in the first series of volumes is identical to the last volume in the second series of volumes. In the same or alternative embodiments, a determination may be made as to whether the second series of volumes includes an additional internal volume that is not included in the first series of volumes. If the second series of volumes does not include any additional volume that is not also included in the first series of volumes, then a synchronization operation may not be performed between the first series of volumes and the second series of volumes (block 550). For example, no volume may be removed from the second series of volumes identified from metadata that is updated by the management server. However, if the second series of volumes does include an additional volume that is not included in the first series of volumes, then a synchronization operation may be performed between the first series of volumes and the second series of volumes by removing the additional volume from the second series of volumes (block 560). For example, the last volume or an internal volume in the second series of volumes may be removed until the second series of volumes matches the first series of volumes. Furthermore, the processing logic may delete the additional volume from a storage device (block 570). For example, after removing the last volume or the internal volume from the second series of volumes, the management server may remove data contents of the removed volume from a storage device.

Figure 6:
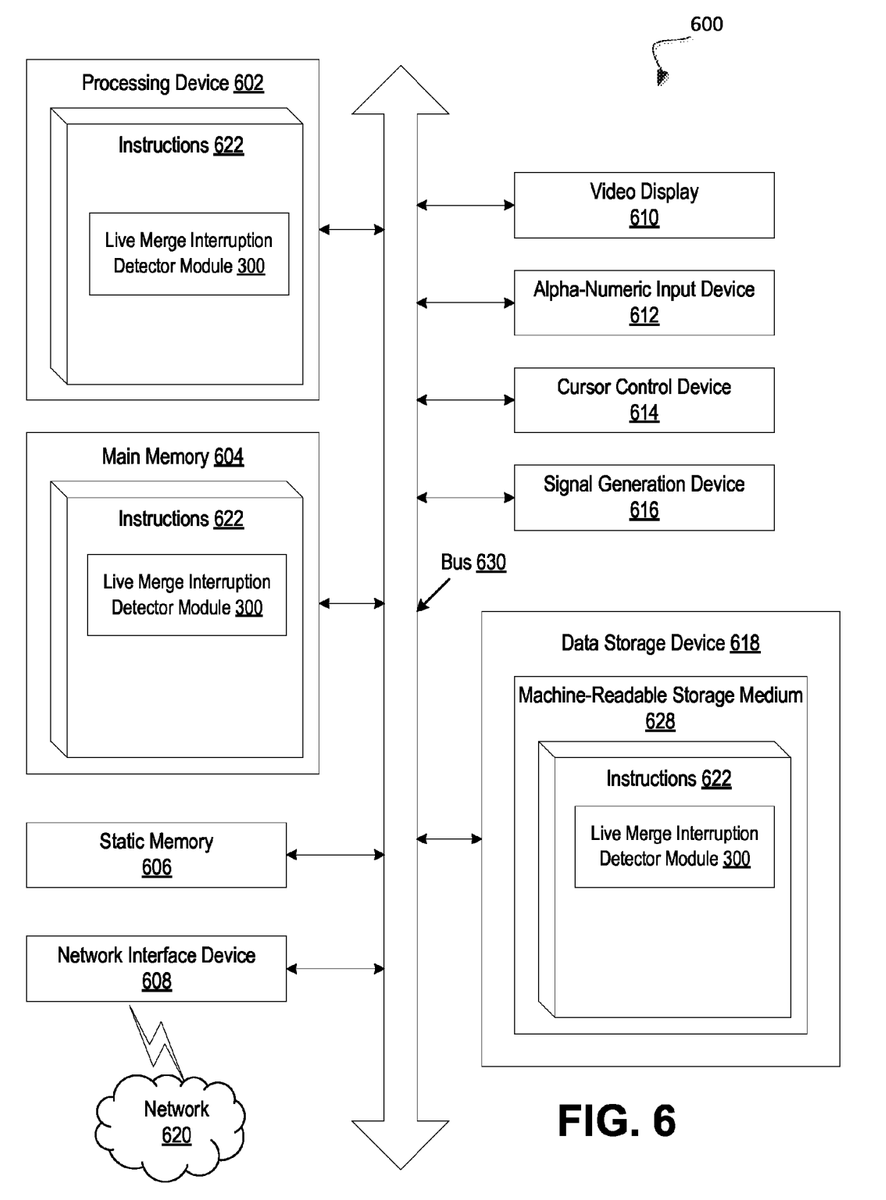
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a live merge interruption detector module (e.g., live merge interruption detector module 121 of FIG. 1 and/or live merge interruption detector module 300 of FIG. 3) and/or a software library containing methods that call modules or sub-modules in a live merge interruption detector module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving a first identification of a series of volumes associated with a virtual disk that is associated with a virtual machine, wherein the first identification is updated in view of a hypervisor associated with the virtual machine and in response to a completed merge operation associated with the virtual disk;
receiving a second identification of a series of volumes associated with the virtual disk, wherein the second identification is updated when a management server that is associated with a plurality of virtual machines detects the completed merge operation;
identifying that an operation associated with the virtual disk has been interrupted by comparing the first identification of the series of volumes with the second identification of the series of volumes to determine that the second identification of the series of volumes comprises an additional volume that is not included in the first identification of the series of volumes; and
in response to identifying that the operation associated with the virtual disk has been interrupted, removing, by a processing device, the additional volume from the second identification of the series of volumes.

2. The method of claim 1, further comprising:
receiving a request to import a volume of data into the virtual disk, wherein the receiving of the first identification and the second identification are in response to receiving the request to import the volume of data into the virtual disk.

3. The method of claim 1, wherein the merge operation is performed while the virtual machine writes new data to the virtual disk.

4. The method of claim 1, wherein the first identification and the second identification of the series of volumes comprises a series of snapshots associated with the virtual disk.

5. The method of claim 1, further comprising:
deleting data associated with the additional volume in response to removing the additional volume.

6. A system comprising:
a memory; and
a processing device, operatively coupled with the memory, to:
receive a first identification of a series of volumes of a virtual disk associated with a virtual machine, wherein the first identification is updated in view of a hypervisor associated with the virtual machine and in response to a completed merge operation associated with the virtual disk;
receive a second identification of a series of volumes of the virtual disk associated with the virtual machine, wherein the second identification is updated when a management server that is associated with a plurality of virtual machines detects the completed merge operation;
identify that an operation associated with the virtual disk has been interrupted by comparing the first identification of the series of volumes with the second identification of the series of volumes to determine that the second identification of the series of volumes comprises an additional volume that is not included in the first identification of the series of volumes; and
in response to identifying that the operation associated with the virtual disk has been interrupted, remove the additional volume from the second identification of the series of volumes.

7. The system of claim 6, wherein the processing device is further to:
receive a request to import a volume of data into the virtual disk, wherein the receiving of the first identification and the second identification are in response to receiving the request to import the volume of data into the virtual disk.

8. The system of claim 6, wherein the completed merge operation associated with the virtual disk combines a last volume of the virtual disk with a previous volume of the virtual disk.

9. The system of claim 6, wherein the merge operation is performed while the virtual machine writes new data to the virtual disk.

10. The system of claim 6, the processing device is further to:
delete data associated with the additional volume in response to removing the additional volume from the second identification of the series of volumes.

11. The system of claim 6, wherein the first identification and the second identification of the series of volumes comprises a series of snapshots associated with the virtual disk.

12. A non-transitory machine-readable storage medium having data that, when accessed by a processing device, cause the processing device to:
receive a first identification of a series of volumes associated with a virtual disk that is associated with a virtual machine, wherein the first identification is updated in view of a hypervisor associated with the virtual machine and in response to a completed merge operation associated with the virtual disk;
receive a second identification of a series of volumes associated with the virtual disk, wherein the second identification is updated when a management server that is associated with a plurality of virtual machines detects the completed merge operation;
identify that an operation associated with the virtual disk has been interrupted by comparing the first identification of the series of volumes with the second identification of the series of volumes to determine that the second identification of the series of volumes comprises an additional volume that is not included in the first identification of the series of volumes; and
in response to identifying that the operation associated with the virtual disk has been interrupted, remove, by the processing device, the additional volume from the second identification of the series of volumes.

13. The non-transitory machine-readable storage medium of claim 12, wherein the processing device is further to:
receive a request to import a volume of data into the virtual disk, wherein the receiving of the first identification and the second identification are in response to receiving the request to import the volume of data into the virtual disk.

14. The non-transitory machine-readable storage medium of claim 13, wherein the completed merge operation associated with the virtual disk combines a last volume of the virtual disk with a previous volume of the virtual disk.

15. The non-transitory machine-readable storage medium of claim 14, wherein the merge operation is performed while the virtual machine writes new data to the virtual disk.

16. The non-transitory machine-readable storage medium of claim 12, the processing device is further to:
  delete data associated with the additional volume in response to removing the additional volume from the second identification of the series of volumes.

\* \* \* \* \*